Sept. 15, 1964 H. SCHADE 3,149,202

DIGITIZATION OF VIDEO SIGNALS

Filed Oct. 11, 1960 2 Sheets-Sheet 1

INVENTOR
HELMUT SCHADE
BY Paul M. Brannen
AGENT

Sept. 15, 1964 H. SCHADE 3,149,202

DIGITIZATION OF VIDEO SIGNALS

Filed Oct. 11, 1960 2 Sheets-Sheet 2

United States Patent Office 3,149,202

Patented Sept. 15, 1964

3,149,202

DIGITIZATION OF VIDEO SIGNALS

Helmut Schade, Sindelfingen, Wurttemberg, Germany, assignor to International Business Machines Corporation, New York, N.Y., a corporation of New York Filed Oct. 11, 1960, Ser. No. 62,049
Claims priority, application Germany Oct. 17, 1959
1 Claim. (Cl. 178—7.2)

The present invention relates to improved means for digitizing video signals, and more particularly relates to an improved means for providing an automatic clipping level control in a photoelectrical scanning system.

In the process of point-by-point photoelectrical scanning of record media carrying marks or printed characters, the amplitude of the electric signals depends on the reflective properties or on the permeability of the areas being scanned. If the reflectivity or transparence of a recording medium is high and the marks or characters arranged thereon are poorly reflective or slightly transparent, the difference in the signal amplitudes occurring in the scanning of the background or a character area, respectively, is so large that it is readily possible to distinguish the signals appearing in the two types of scanning. For that purpose, it has been proposed to use a correlating or clipping circuit including a biased diode passing only signals the voltage level of which exceeds a predetermined value. In practice, however, it may happen that the recording media exhibits highly different reflectivities or transparencies, respectively, and the characters are of a highly differing blackness. In character recognition systems having to meet very strict requirements as to reliability of operation and freedom from disturbances, it is even necessary to consider the extreme case that the reflectivities of some characters are equal to, or even worse than, the reflective properties of the background in another area of the same record medium.

In order to eliminate these disadvantages, it has been proposed to use correlating or clipping circuits with variable levels which at the start of the scanning of each individual record medium are newly adjusted by a test scanning operation. Using such an arrangement, it would, however, be impossible to consider any changes within one and the same record medium. For continuously adjusting the level, it has been proposed to transmit the video signals to the subsequent circuits through a delay line, the undelayed signals being used for level adjustment. Such arrangements, however, have the disadvantage that only the range within a very narrow strip is examined which has proved to be disadvantageous. Arrangements operating on a similar principle for covering a larger area are dependent on a predetermined scanning program which does not permit the use of a number of particularly advantageous recognition circuits.

An object of the present invention is to provide an improved automatic clipping level control circuit for a point-by-point scanning system.

A further object of the invention is to provide an automatic clipping level control circuit which sets the clipping level for each and every scanning point.

Another object of this invention is to provide an automatic clipping level control circuit which does not require a complete preliminary scanning of the record medium.

Another object of the invention is to provide an automatic clipping level control circuit which sets the clipping level during the scanning operation.

In order to attain these and other objects, the present invention provides means for producing a variable reference potential dependent on the brightness of the area surrounding the respective image point being scanned, wherein besides the scanning of an image point, the area directly surrounding it is also scanned, preferably by blurring the scanning beam, the signal derived from the scanning of the area surrounding the respective image point serving to produce a controlling or limiting potential.

The video signals produced by point-by-point photoelectric scanning of the type employed in television scanning are during the scanning periods during which the beam is sharply focussed applied to the serially connected recognition circuits, whereas during the scanning periods in which the beam is blurred they are applied to an arrangement for effecting the adjustment of the above-mentioned reference potential. Since only a very small area is covered during the interval in which the beam is sharply focussed, whereas the blurred beam covers a much larger region, the last-mentioned scanning operation serves to examine the surroundings of the actual image point to be scanned and to produce the said reference potential as a function of the signals obtained in the scanning of such surroundings. This scanning of the image point surroundings may be effected, for example, by periodic blurring of the scanning beam or by corresponding periodic blurring of the image to be scanned. In view of the fact that, as stated above, with the scanning beam sharply focussed a much smaller image region is covered than with the scanning beam out of focus, each individual image point is first scanned with the scanning beam out of focus for examining the image point surroundings and immediately thereafter with the scanning beam sharply focussed for effecting the actual scanning operation. The electric video signals obtained by the first mentioned type of scanning serve to set up a limiter circuit or to control the responsiveness of an amplifier circuit to which the pulses obtained in the last-mentioned type of scanning are applied. The same conditions exist if the images of the characters to be sensed are blurred. It is, however, also possible, for examining the image point surroundings, to use a second scanning beam having a corresponding cross section. According to another variation of the invention, the surroundings of an image point are scanned in one or more positions of the scanning beam differing from the position of the beam in scanning the actual image point. In this manner it is possible to obtain a better definition of the size and shape of the prescanned area. On the other hand, it is also possible to assign to the individual positions of the beam in prescanning different influences on the clipping circuit or the amplifier device, respectively.

The signals produced in the prescanning of the surrounding area and in the scanning of the actual image point, are, as stated above, separated from each other and respectively used to control the threshold value of a suitable amplifier or applied to such amplifier as input signals. In accordance with this invention, the switching between the focused and blurred scanning operations is effected by applying pulses to the image-forming element. The same pulses or other pulses or pulse series appearing in synchronism therewith are applied to the deflecting elements for effecting the changes in the relative positions between the image and the scanning means during the prescanning and the actual scanning.

According to a particularly advantageous embodiment of the invention, a differential amplifier having two inputs is used for the selection of predetermined sections of the sequence of signals produced out of the pulses generated in focussed and blurred scanning. The first of these two inputs is connected directly, the second through a capacitor to the signal source, the resistance of which should be as low as possible. The second input is also connected to a sampled clamping circuit. With the clamping circuit effective, the signals only reach one input of the differential amplifier, so that they are available at the output thereof. The other input, which is connected through a capacitor to the signal source, is connected by the clamping circuit to a fixed potential, so that the signals merely effect a charging of the capacitor. If now the clamping circuit is rendered ineffective, the signals reach both inputs of the differential amplifier, so that no signal changes occur at the output thereof. Due to the charge on the capacitor, the voltage existing at the amplifier output at the moment the clamping circuit becomes ineffective is maintained until the next effective signal occurs. By combining two or more of such alternately sampled arrangements, a signal sequence may be distributed among different channels.

The foregoing and other objects, features and advantages of the invention will be apparent from the following more particular description of a preferred embodiment of the invention, as illustrated in the accompanying drawings.

Figure 1:
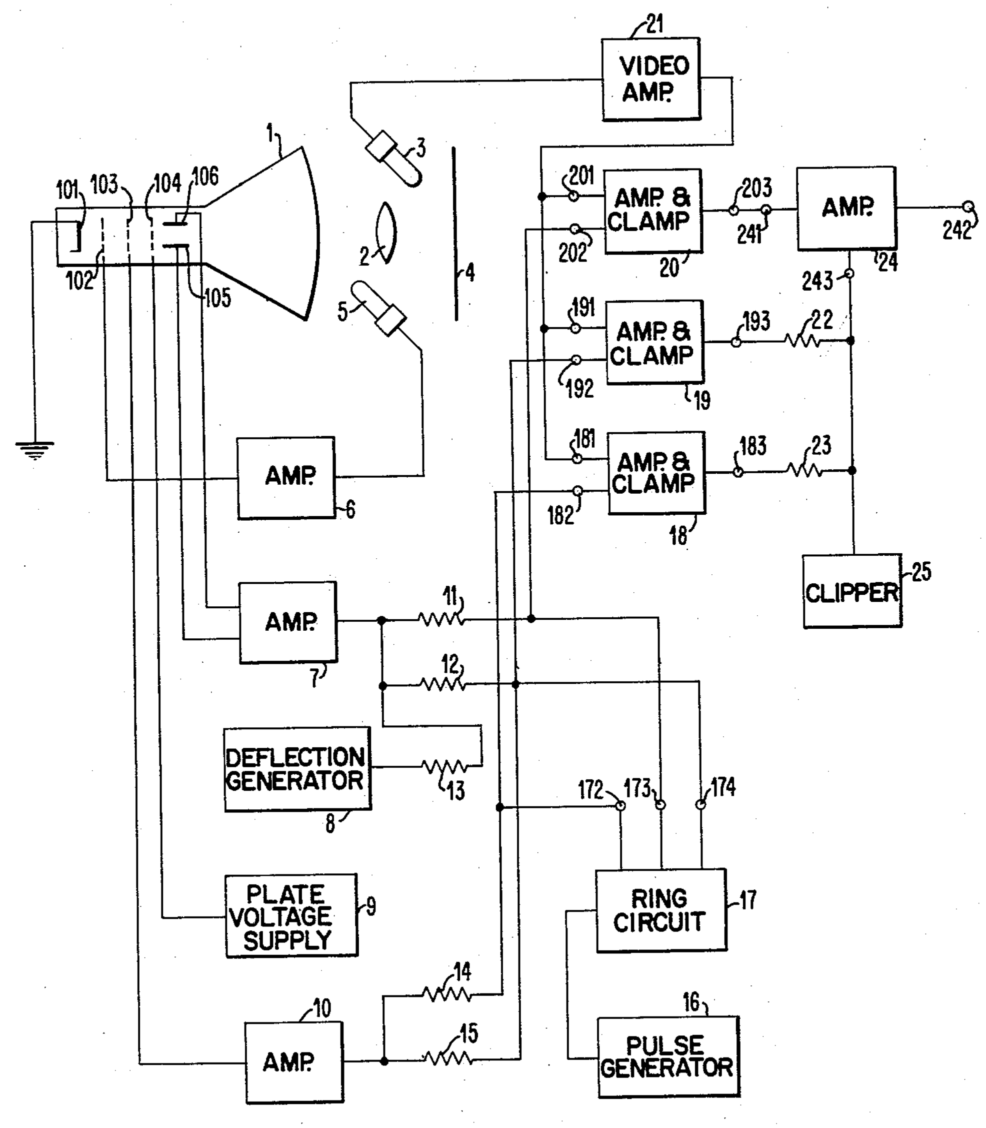
FIG. 1 represents the block diagram of a preferred embodiment of the invention.

Referring to FIG. 1, the vertically moving cathode ray produces on the luminescent screen of the cathode ray tube 1 a luminous spot moved in a straight line parallel with the plane of the paper sheet, said spot being projected by means of the lens 2 to the record medium 4. Due to a simultaneous movement of the record medium 4 perpendicular to the paper plane, the spot describes thereon closely spaced vertical lines in the manner of a television raster. Depending on whether the spot impinges on the well reflecting background of the record medium or on a poorly reflecting blackened character element, much or little or no light will reach the light-sensitive element 3. The light-sensitive element 5, which is reversely fed back through the amplifier 6 to the grid 102 of the cathode ray tube 1, causes the cathode ray of the cathode ray tube 1 to be controlled in such a manner that a constant brightness of the light spot is insured. The plate voltage for the cathode ray tube 1 is produced in the generator 9 and applied to the plate 104 of that tube. The ring circuit 17, which may be, for example, a so-called Overbeck ring, comprises three bistable multivibrators connected in series in the form of a closed ring, is controlled by the pulse generator 16 and at its outputs 172 and 173 and 174 produces pulses occurring in cyclic succession. These pulses are applied to the circuits 18, 19 and 20 as well as to the circuits 7, 8 and 10. The pulses applied to the grid 103 through resistors 14, 15 and the amplifier 10 effect a periodically recurring blurred adjustment of the cathode ray of the cathode ray tube 1 which causes the size of the light spot to be increased by approximately a power of ten. The pulses applied to the deflection plates 105 and 106 via the resistors 11 and 12 and the amplifier 7 cause the voltages of the deflection generator 8 directed to the amplifier 7 through the resistor 13 to be changed in such a manner that the cathode ray of the cathode ray tube 1 during each blurred adjustment is moved into two different, closely spaced positions differing from the position the cathode ray assumes during its sharply focused adjustment.

Figure 2:
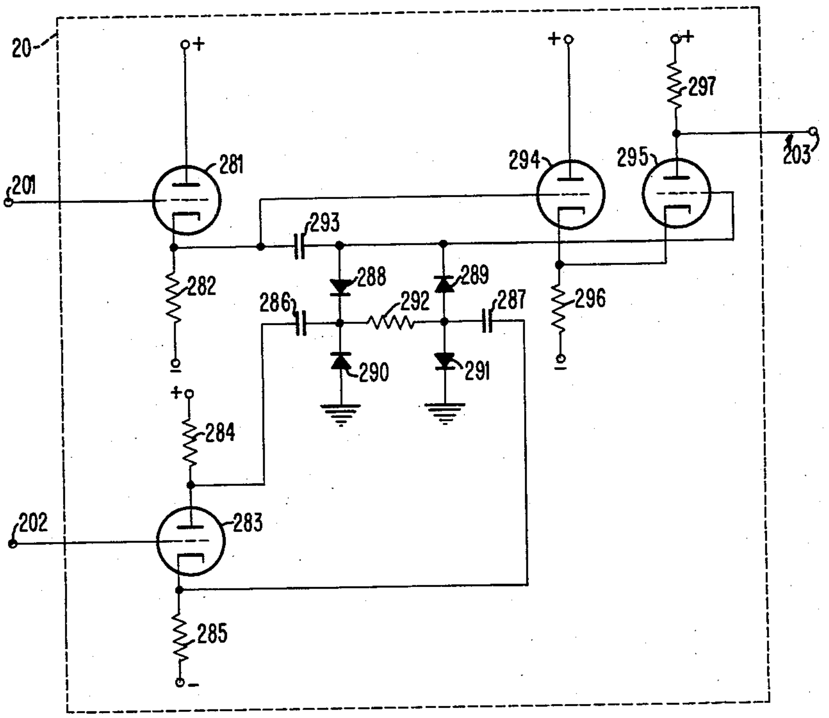
FIG. 2 is a circuit diagram for one form of amplifier and clamping circuits employed in selecting different sections of a signal sequence.

The pulses of the ring circuit 17 applied to the circuits 18, 19 and 20 effect a separation of the video signals occurring during scanning with the sharply focussed cathode ray and during scanning with the blurred cathode ray. The last-mentioned signals control the threshold value of the amplifier 24 acting as the digitization circuit to which the first-mentioned signals are directed to digitization, i.e., determination of whether they are to be assigned to a black or a white image point. It should also be mentioned that the diameter of the light spot produced by the sharply focused cathode ray is small as compared to the width of the lines to be scanned. The arrangement 25 shown in FIG. 1 serves to clip the control potential if a maximum value is exceeded or fallen short of. The operation of the arrangements 18, 19 and 20 will be described with reference to FIG. 2. The video signal is applied to the terminal 201 and is available with a low impedance at the cathode resistor 282 of the cathode follower 281. In some cases it may be advisable to replace the cathode follower shown here with circuits having an even smaller output resistance, e.g., feedback amplifiers. The two tubes 294, 295 and the resistors 296 and 297 form a known type of differential amplifier one input of which is conductively connected to the cathode follower 281 and the second input of which is coupled to the cathode follower 281 through the capacitor 293. The arrangement comprising the capacitor 293, the four diodes 288, 289, 290, 291, the additional capacitors 286, 287 and the resistor 292 is known in the television art as a clamping circuit or D.C. restoring circuit. Therefore, a more detailed description of its operation is deemed unnecessary. Sampling of the clamping circuit is effected by pulses applied to the terminal 202. These pulses control the grid of tube 283 which in conjunction with resistors 284 and 285 produces the oppositely phased pulses required for the operation of this circuit. During the actual scanning process, i.e., during the scanning with the sharply focussed cathode ray, the terminal 202 is positive, so that the grid of the tube 295 has its potential brought to and clamped at ground value by means of the clamping circuit through the four diodes. The other input of the differential amplifier, viz. the grid of tube 294, is controlled by the video signal, so that the latter is available at the output terminal 203. At the end of the actual scanning operation, the clamping circuit is blocked by the potential of terminal 202 decreasing to zero, and the grid of tube 295 follows, because of the theoretically now infinite time constant of the circuit comprising the capacitor 293, and the clamping circuit, the changes of the video signal, so that from the moment of the clamping circuit being blocked the output voltage of the terminal 203 is no longer changed. Thus, the signal at terminal 203 remains proportional to the video signal of the last actual scanning operation. The arrangements 19 and 18 are identical in structure. It should be noted that the resistor 296 must be selected to have a high value; particularly the differential resistance of this structural component should meet this requirement. Therefore, it may be advisable to replace it with a triode oppositely coupled through a cathode resistance or with a pentode.

Figure 3:
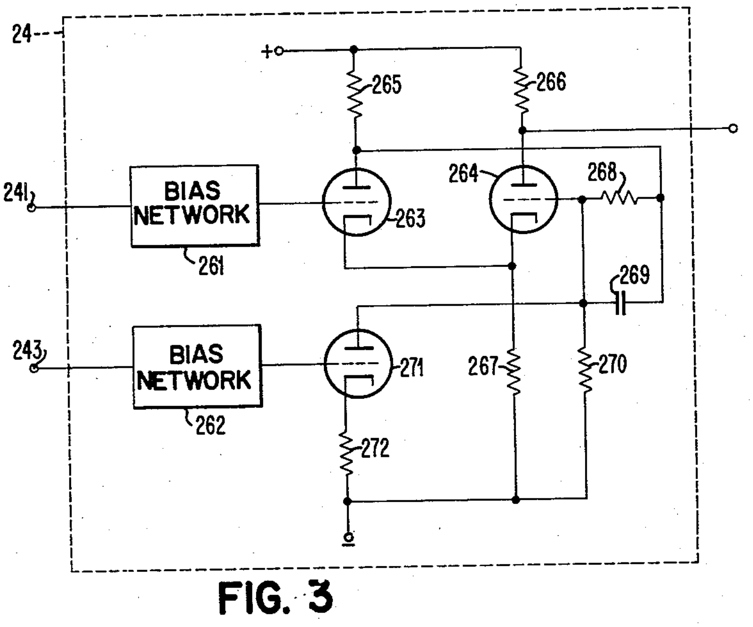
FIG. 3 is a circuit diagram of one form of controllable clipping or digitization circuit operating in accordance with the principle of the Schmitt trigger.

The circuit of FIG. 3 together with the tubes 263 and 264 and the resistors 265, 266, 267, 268, 270, 272 and the capacitor 269 forms a so-called Schmitt trigger having a gain of 1, for example, so that the triggering from one stable state into the other is respectively effected with the same input voltage value. The input voltage of the Schmitt trigger is equal to the video signal for the actual scanning process at terminal 241. The arrangement 261 serves to produce the D.C. bias required for the Schmitt trigger. Such circuits are well known; therefore, a more detailed description of their operation is deemed unnecessary. Moreover, there is provided in this circuit a triode 271 for controlling the threshold value of the operating potential of the Schmitt trigger as a function of the voltages applied to the terminal 243. The arrangement 262 which serves to adjust the proper D.C. bias, in the embodiment shown in FIG. 1, effects an inversion of the signals applied thereto. The manner of operation of the entire arrangement shown in FIG. 1 is as follows:

The cathode ray, which is moved up and down in the plane of the paper by means of the deflection plates 105 and 106 produces on the screen of the cathode ray tube 1 an upwardly and downwardly moving luminescent spot which is projected by means of the lens 2 to the recording medium 4. Due to a simultaneous movement of said recording medium in a direction perpendicular to the plane of the paper, the image of this spot is moved in closely spaced lines over the surface thereof in the manner of a television raster. A voltage which is proportional to the reflection factor of the respectively scanned area is produced by the photosensitive cell 3 and applied through the video amplifier 21 to the terminals 181, 191 and 201 of the circuits 18, 19 and 20. The arrangement 20 is controlled through the terminal 202 by the ring circuit 17 in such a manner that the video signal, as long as the spot of the cathode ray tube is sharply focussed, passes this circuit without any changes. In addition to the focussed scanning, as mentioned above, there are effected two additional scanning operations in which the spot diameter is increased by one order or more by changing the voltage at the focus electrode 103. The latter two scanning operations serve to produce the control voltage for the threshold value regulation of the digitization circuit 24 and differ in their different relative positions with respect to the position of focussed scanning. The focused scanning lies here in the center between the centers of the blurred light spots. By the pulses occurring in cyclic succession at the terminals 172, 173 and 174 of the ring circuit 17, the above-described blurred scanning operations are effected in cyclic succession and the video signals produced in the scanning operations by means of the photosensitive cell 3 are pased in cyclic succession by the circuits 18, 19 and 20. The circuits 18 and 19 are controlled by pulses applied through terminals 182 and 192.

As may be readily seen from the above, the electric signals obtained in a focussed scanning operation are applied to the input 241 of the amplifier 24, whereas the pulses obtained in the blurred scanning operations are directed through resistors 22 and 23 to the input 243 of the amplifier 24. The electric signals occurring at terminal 242 correspond to the electric pulses obtained during the focussed scanning operations, which are digitized in the circuit 24, i.e., assigned to the values White and Black in an unequivocal manner. The level of the amplifier 24 having the form of a Schmitt trigger is set by the electric values applied to the terminal 243. The scanning cycle consisting of one focussed and two blurred scanning operations is passed so rapidly that the ray deflection caused by the deflection generator 8 is small as compared to the line width of the characters.

During the actual, i.e. focussed scanning operation, the focus electrode 103 due to the network comprising the resistors 14 and 15 and the circuit 10 and the pulses originating from the ring circuit 17 has a voltage thereon which causes the light spot to be adjusted to a maximum focus. During this time, a voltage exists only at the terminal 173. During the two auxiliary scanning operation, the terminals 172 and 174 of the ring circuit 17 have voltages thereat raising the potential of the input terminal 108 of the amplifier 10 in such a manner that the focus electrode 103 increases the diameter of the light spot in any desired manner. In this case, the resistors 14 and 15 are of the same value. The change in the relative position between the three scanning operations is effected by adding the output voltages at terminals 173 and 174 of ring circuit 17 to the deflection voltage of the deflection generator 8 by means of the resistor network 11, 12 and 13. The total voltage is then amplified in the amplifier 7 and applied to the deflection plates 105 and 106. With equal distances from the centers of the blurred images to the centers of the focussed images of the light spot, the ratios of the values of resistors 12 and 11 are 1:2.

At the output of the video amplifier 21, the video signal is available which in cyclic succession contains the information of the actual scanning operation and of the two blurred auxiliary scanning operations. The information of the different scannings is separated by the arrangements 20, 19 and 18 in such a manner that at terminal 203 there occurs the information of the actual scanning operations and at terminals 193 and 183 the information of the one and the other auxiliary scanning operation, respectively, for this purpose, the units 20, 19 and 18 are sensed at terminals 202, 192 and 182 by the pulses of the ring circuit 17 coinciding with the time intervals of the information to be separated. The manner of operation of the units 18, 19 and 20 as well as of the unit 24 has already been explained in connection with the description of FIGS. 2 and 3. Control of the amplifier 24 is effected by the potentials applied to the terminals 193 and 183, said potentials being composed according to any suitable rule. In the shown embodiment, the resistors 22 and 23 are selected to have equal values, so that the arithmetic mean of the voltages at terminals 193 and 183 is taken. However, the control voltage may also be produced according to the rule that the respectively higher voltage is decisive. This rule may be met by means of a so-called OR circuit. On the other hand, it is also possible to select the control voltage to be respectively equal to the lower voltage of the two signals, which may be achieved by means of a so-called AND circuit. A further possibility consists in forming the difference of the voltages at terminals 142 and 243 and using the result, possibly after multiplication by a suitable factor, for the control of the circuit 24. In this case, the tube 271 would be unnecessary.

The signals occurring at terminal 242 contain an unequivocal information as to the presence of blackened regions on the recording medium 4, independently of variations in the reflectivities of the background of the recording medium or the degree of blackness of the represented characters.

From the foregoing it is apparent that an automatic clipping level control circuit or digitization circuit in accordance with the present invention provides a novel and useful means for continuously determining a suitable clipping level in a photoelectrical scanning system, by providing, for each of a series of sharply focussed scanning spots, a corresponding plurality of defocussed scanning spots, the defocussed scanning being employed to set the threshold level of an adjustable clipping level control circuit.

While the invention has been particularly shown and described with reference to a preferred embodiment thereof, it will be understood by those skilled in the art, that the foregoing and other changes in form and details may be made therein without departing from the spirit and scope of the invention.

What is claimed is:

In a scanning system including a flying spot scanner comprising a cathode ray tube scanner having a focussing electrode for controlling the focus of the scanning spot, deflecting electrodes for positioning the scanning spot, and including photoresponsive means effective to generate video signals in response to the scanning of a record by said flying spot scanner, an automatic clipping level control system comprising, in combination, a clipping circuit having first and second input terminals, said clipping circuit including means responsive to a control signal supplied to said second input terminal for determining which signals supplied to said first input terminal will provide output signals, means for cyclically connecting said photoresponsive means to said first or said second input terminal and means for cyclically supplying signals to said focussing electrode and said deflecting electrodes for alternately focussing and defocussing said scanning spot and deflecting said defocussed scanning spot, in accordance with the connection of said photoresponsive means to said first or said second input terminals, respectively.

References Cited in the file of this patent

UNITED STATES PATENTS

| | | |
|---|---|---|
| 2,691,696 | Yule | Oct. 12, 1954 |
| 2,855,513 | Hamburgen | Oct. 7, 1958 |
| 2,892,887 | Hell | June 30, 1959 |
| 2,921,128 | Gibson | Jan. 12, 1960 |
| 2,962,548 | Taudt | Nov. 29, 1960 |